March 9, 1965 A. R. UHLIG 3,172,152
WASTE REMOVAL MECHANISM FOR A PLASTIC FORMING MACHINE
Filed July 30, 1962 9 Sheets-Sheet 3

INVENTOR.
ALBERT R. UHLIG
BY
ATTORNEYS

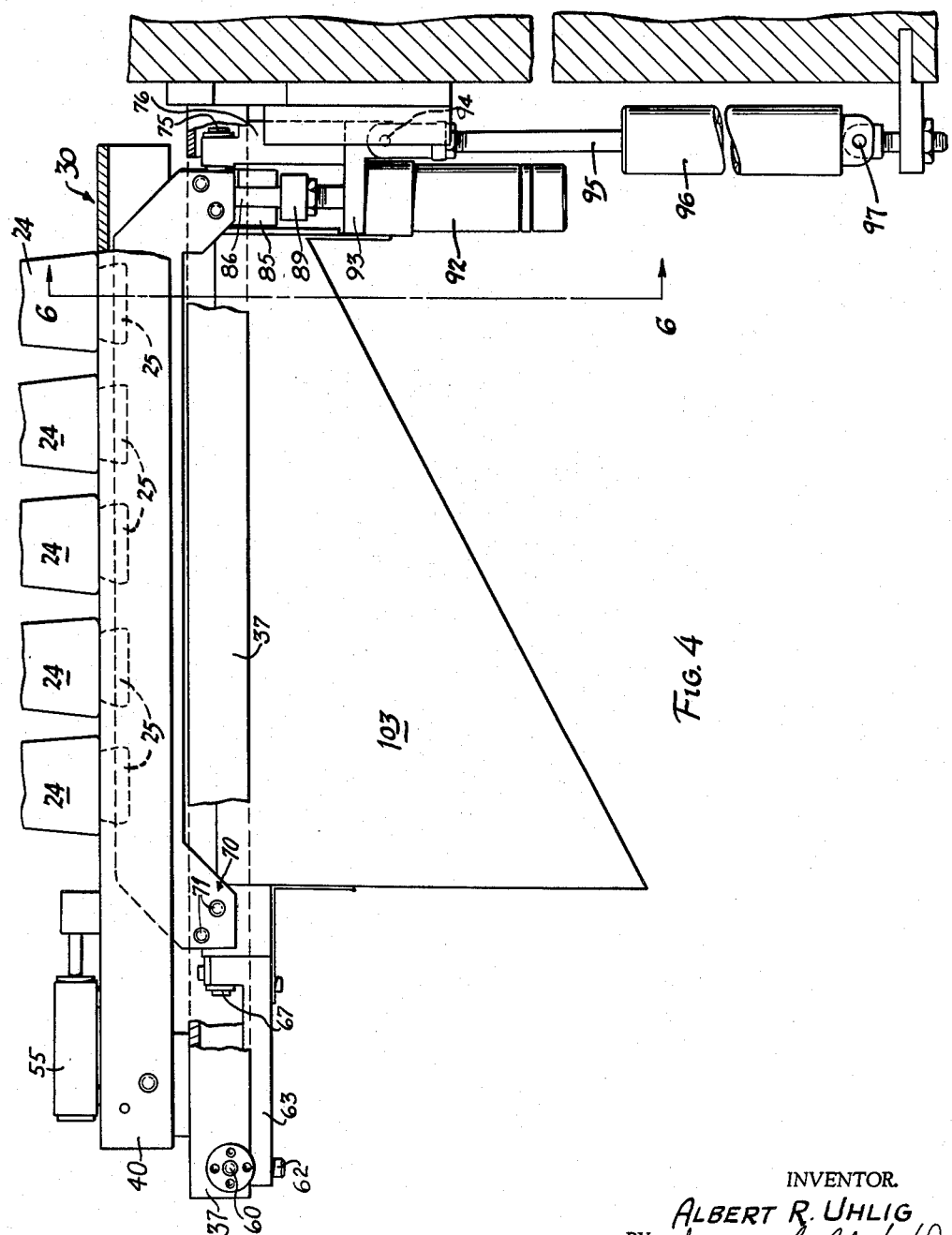

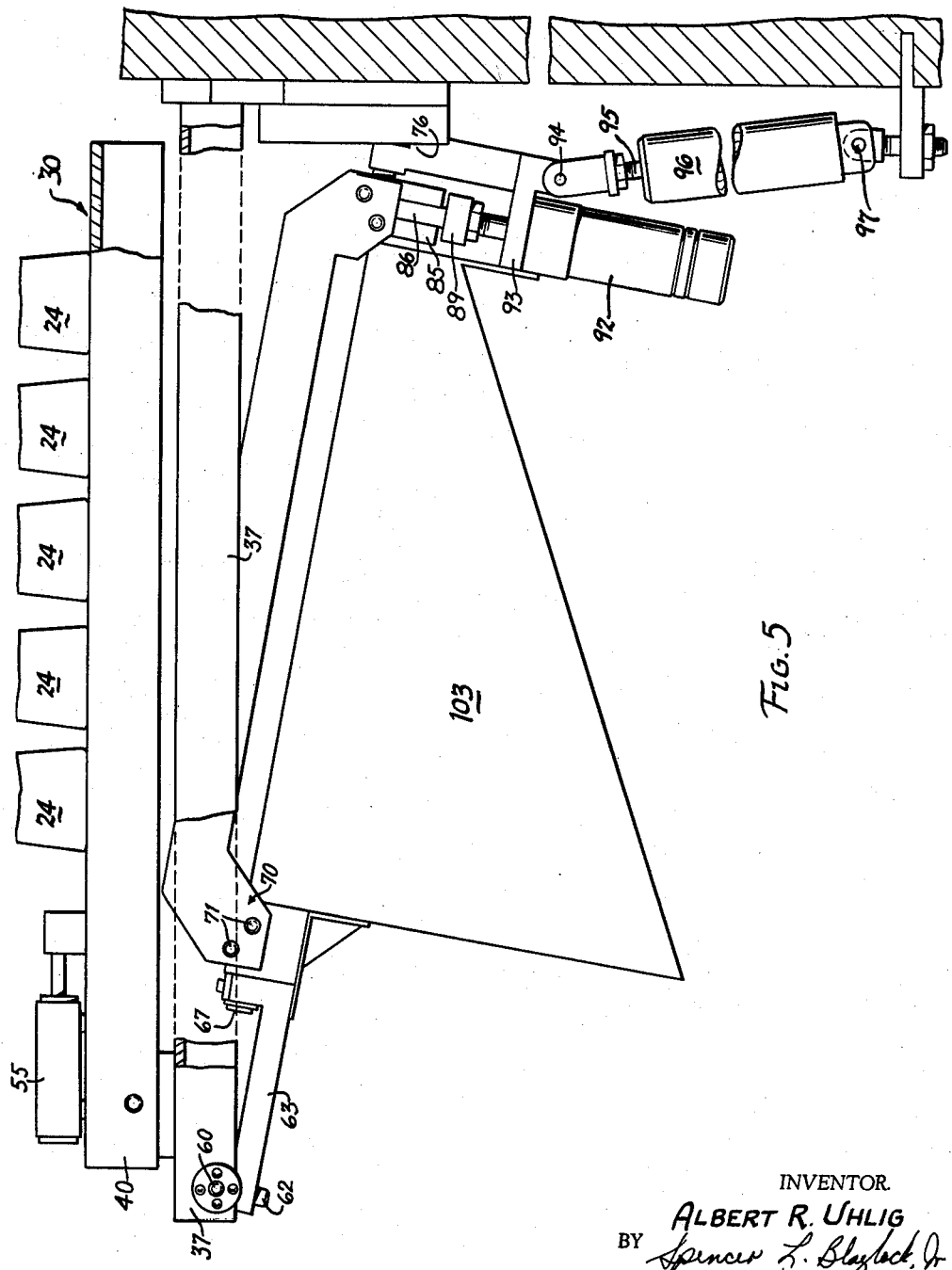

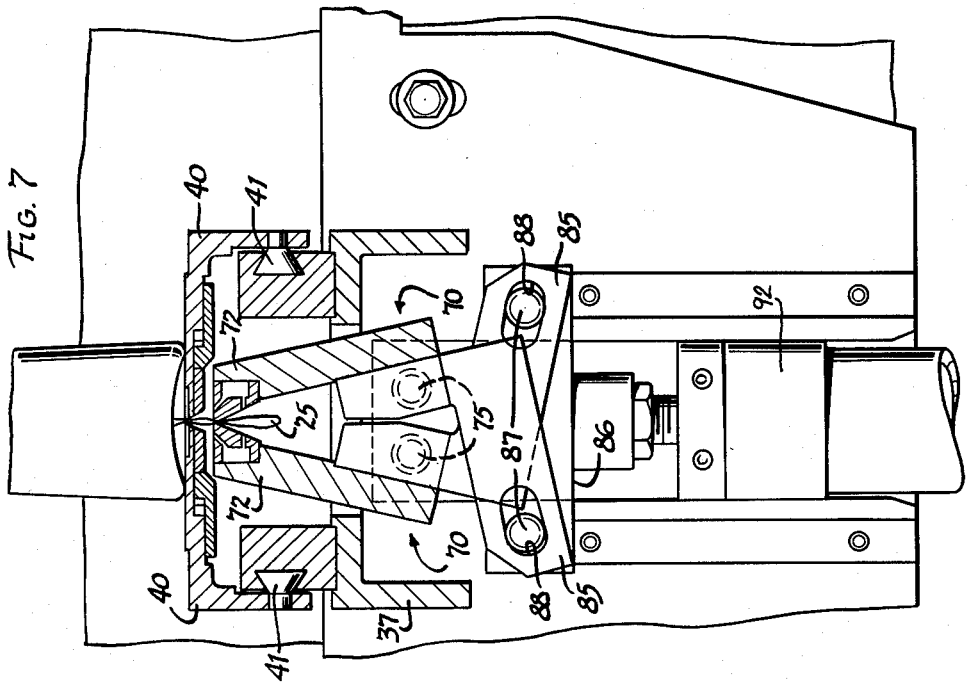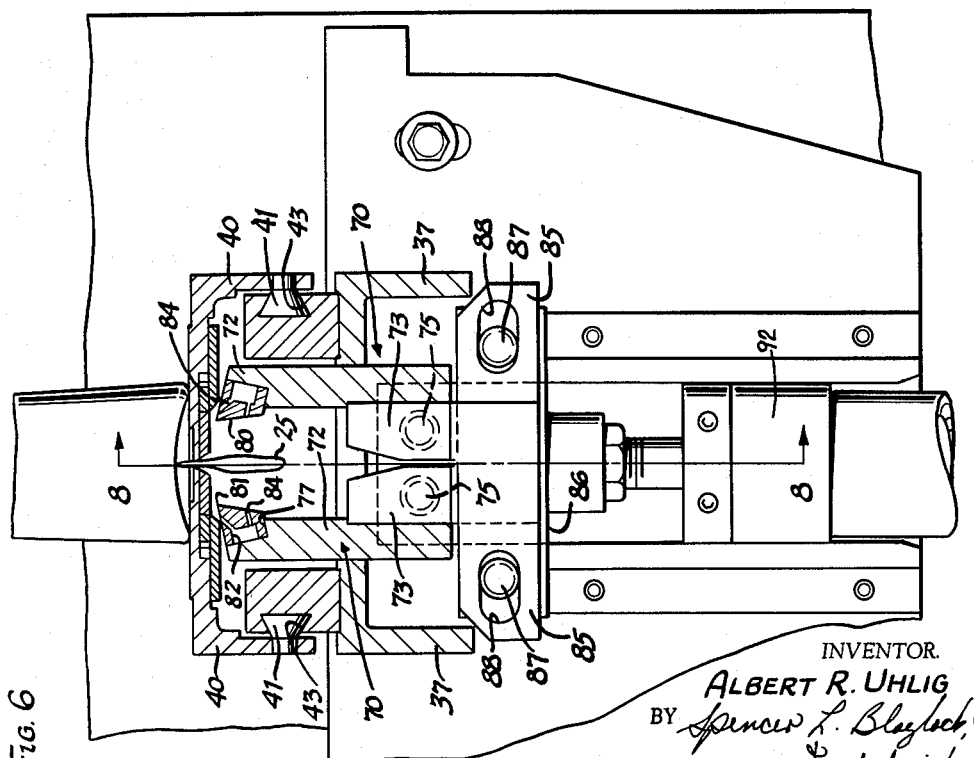

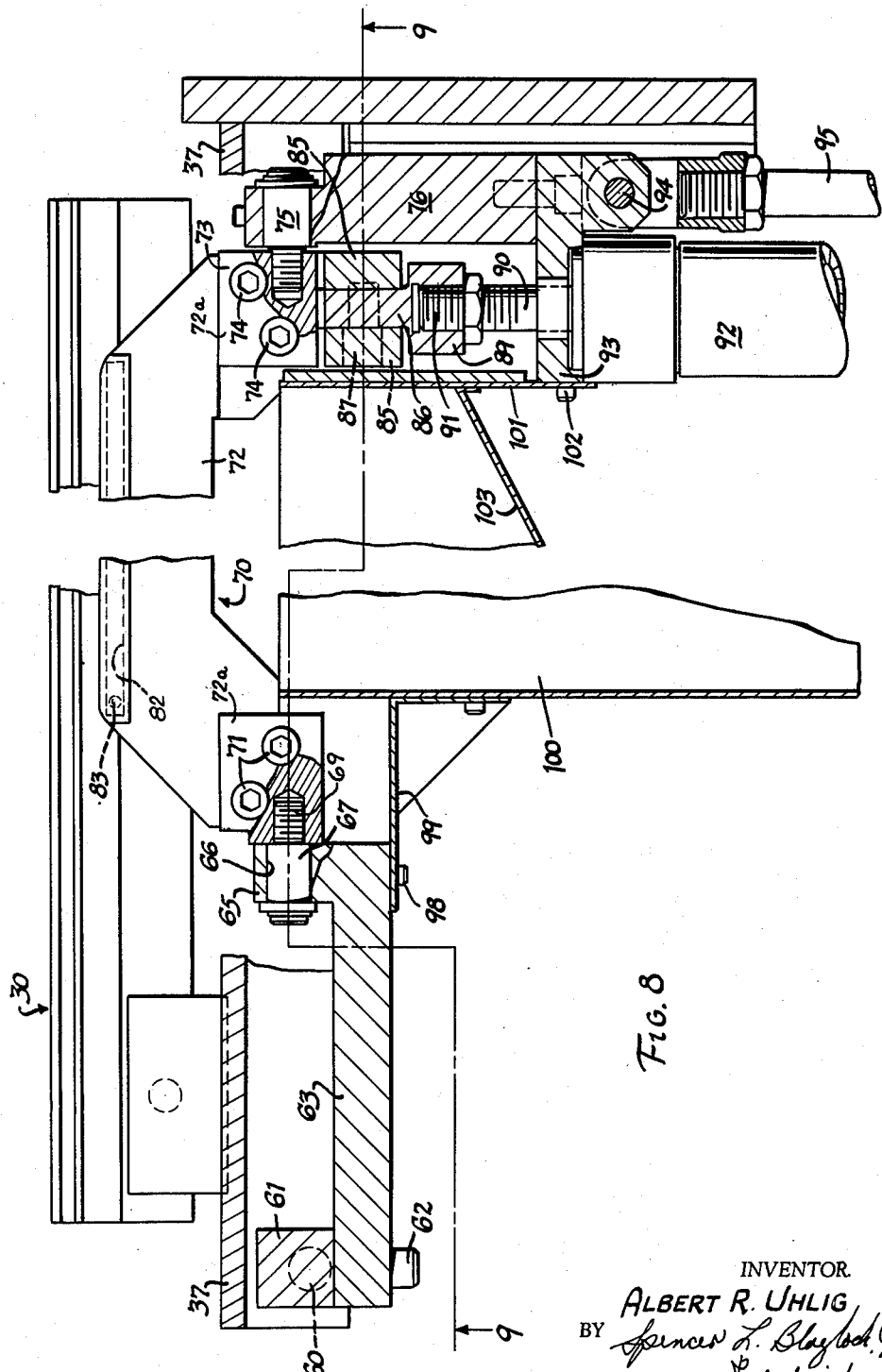

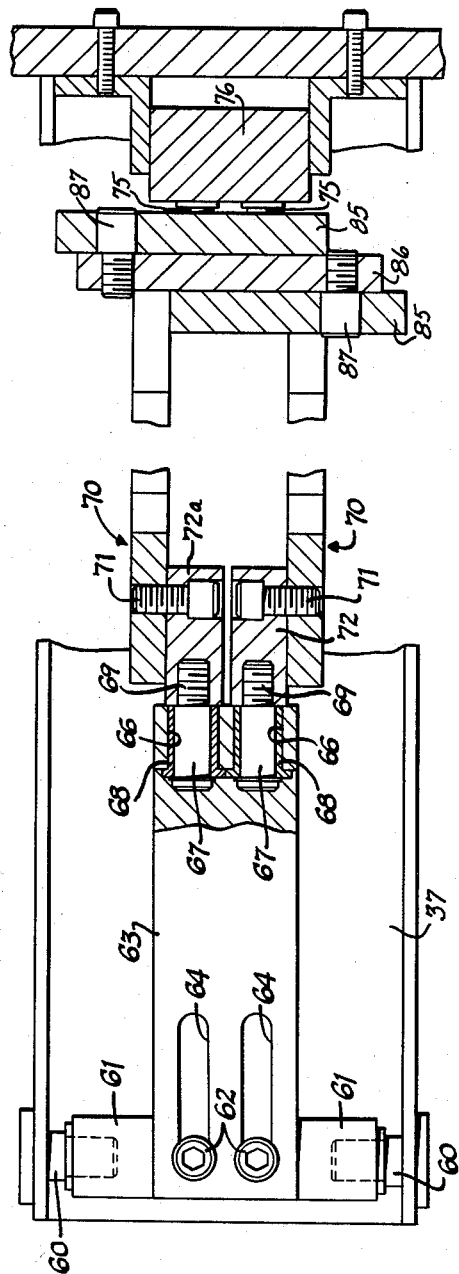

March 9, 1965 A. R. UHLIG 3,172,152
WASTE REMOVAL MECHANISM FOR A PLASTIC FORMING MACHINE
Filed July 30, 1962 9 Sheets-Sheet 9
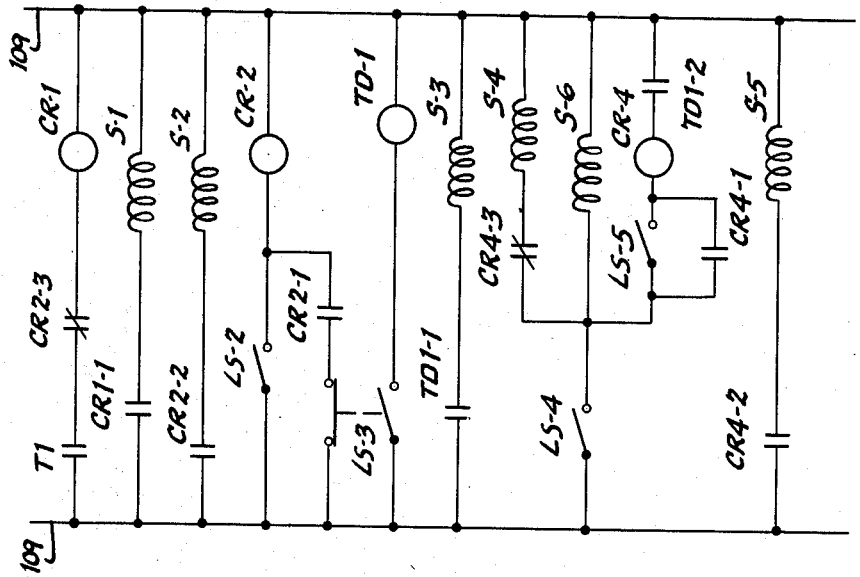
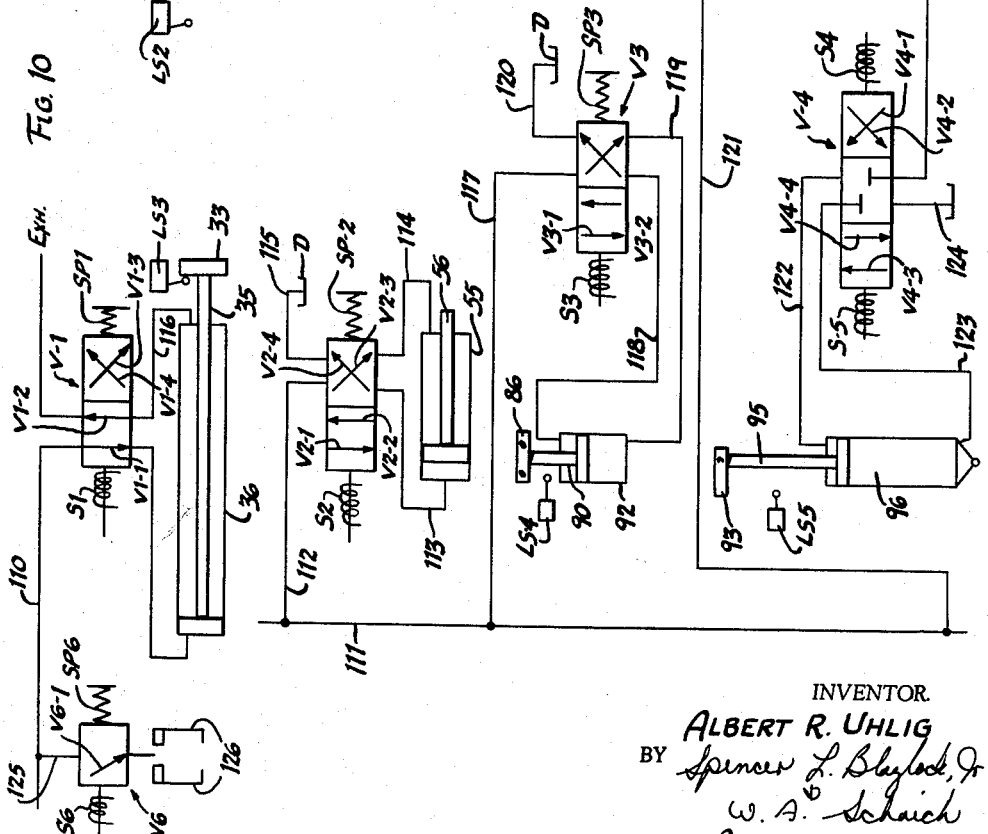
INVENTOR.
ALBERT R. UHLIG
BY
ATTORNEYS

# United States Patent Office 3,172,152
Patented Mar. 9, 1965

3,172,152
WASTE REMOVAL MECHANISM FOR A PLASTIC FORMING MACHINE
Albert R. Uhlig, Toledo, Ohio, assignor to Owens-Illinois Glass Company, a corporation of Ohio
Filed July 30, 1962, Ser. No. 213,529
6 Claims. (Cl. 18—2)

The present invention relates to a waste removal mechanism for a plastic forming apparatus and, more particularly, to apparatus for removing waste portions from a plurality of formed articles after the articles have been removed from a plastic forming apparatus.

The present invention constitutes an improvement over the similar apparatus disclosed in the copending application of Joseph E. Boyer, Serial No. 76,037, filed December 15, 1960, now Patent No. 3,060,497 and assigned to the assignee of the present invention.

Waste removal mechanisms of this general type are particularly adapted for utilization in conjunction with a plastic forming machine of the type illustrated in Patent No. 3,008,192, also assigned to the assignee of the present invention.

The device of the present invention is adapted for the removal of waste portions from one or more formed articles from a forming machine in which each article is retained by its connection, through a waste portion, to a portion of the forming machine, such as an orifice or the like. The device of the present invention preferably is incorporated into an overall take-out mechanism which serves the several functions of removing the articles from their positions within the forming machine, rupturing the connection between the articles and the machine forming orifice or the like, removing the waste portions from the formed articles, and then releasing the waste-free articles for packing or further processing, as desired.

In the above-identified Boyer application, there is disclosed a longitudinally displaceable supporting plate which is moved from a retracted position exterior to the forming machine to an inserted position at which the plate contacts the formed articles to support the articles in an upright position. The plate is provided with a slot through which waste portions or "tails" of the formed articles project, and gripping means are actuated after insertion of the plate to engage the waste portions and to secure the waste portions, and the articles adhered thereto, to the plate for co-movement during retraction. After retraction of the plate and the articles surmounting the plate, gripping means are released and the waste portions are engaged and removed by a "tail-removal" mechanism.

The present invention utilizes the extensible and retractable plate and gripping means of the Boyer structure, but utilizes a novel tail-removal mechanism of simplified and more efficient design. More particularly, the tail removal mechanism disclosed in the Boyer application utilizes separate, cam-actuated tail engaging removal elements which are jointly actuated arcuately to tear the tails from the finished articles. By contrast, the present invention utilizes a pair of gripping elements which are actuated with a "scissors-like" motion to engage the tails as the articles are supported upon the removal plate. Two such tail grippers are utilized, the grippers cooperating to engage the tails of all of the plurality of articles simultaneously. The gripping elements are then actuated around a common pivot location to tear the tails from the articles in progressive fashion.

More particularly, the mechanism of the present invention includes a pair of gripper arms between which the take-out plate positions the tails of the articles after the articles have been removed from the forming machine, these arms being pivoted for relative displacement about an axis spaced from the articles into and out of engagement with the article tails. The gripper arms are actuated into engagement with the article tails by suitable actuating means, such as a fluid actuated piston and a scissors-type linkage, and the gripper arms are then displaced vertically about a different common axis of movement by further actuating means, such as a different fluid pressure actuated cylinder, while the articles remain in position upon the take-out plate.

This joint pivotal movement of the arms tears the tails from the articles with the pivotal movement about the remote axis insuring the progressive removal of the tails. Finally, the gripping arms release the tails which then fall through a disposal chute for regrinding and return to the forming machine. The articles from which the tails have been removed can now be removed from the take-out plate for use or further processing, as desired.

It is, therefore, an important object of the present invention to provide a new and improved apparatus for removing waste portions from one or more formed articles after the articles have been removed from a plastic forming apparatus.

Another important object of the present invention is the provision of a novel tail removal mechanism including a pair of gripper elements for simultaneously engaging the tails of formed articles and means for moving the gripping elements about a common axis to tear the tails from the formed articles.

It is a still further, and no less important, object of this invention to provide a tail removal mechanism for tearing tails from formed articles and in which a pair of gripping elements engaging the tails direct a cooling medium against the tails prior to and during their removal from the articles to insure clean severance of the tails.

Other objects of this invention will appear in the following description and appended claims, reference being had to the accompanying drawings forming a part of this specification wherein like reference characters designate corresponding parts in the several views.

On the drawings:
FIGURE 1 is a plan view of a take-out device of the present invention as utilized in conjunction with a forming machine, the take-out being illustrated in its retracted position, i.e. prior to its insertion into the forming machine;

FIGURE 4 is a side elevational view of the take-out device in its retracted position of FIGURE 1 and specifically illustrating the tail removal mechanism;

FIGURE 5 is a view similar to FIGURE 4 illustrating the take-out in a tilted, operative position;

FIGURE 6 is a sectional view taken along the plane 6—6 of FIGURE 4;

FIGURE 7 is a view similar to FIGURE 6 illustrating the device in an adjusted position;

FIGURE 8 is a sectional view taken along the plane 8—8 of FIGURE 6;

FIGURE 9 is a bottom view taken along the plane 9—9 of FIGURE 8;

FIGURE 10 is a schematic diagram of the fluid pressure actuated components of the take-out mechanism; and FIGURE 11 is a schematic diagram of the electrical control components of the take-out mechanism.

Before explaining the present invention in detail, it is to be understood that the invention is not limited in its application to the details of consrtuction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
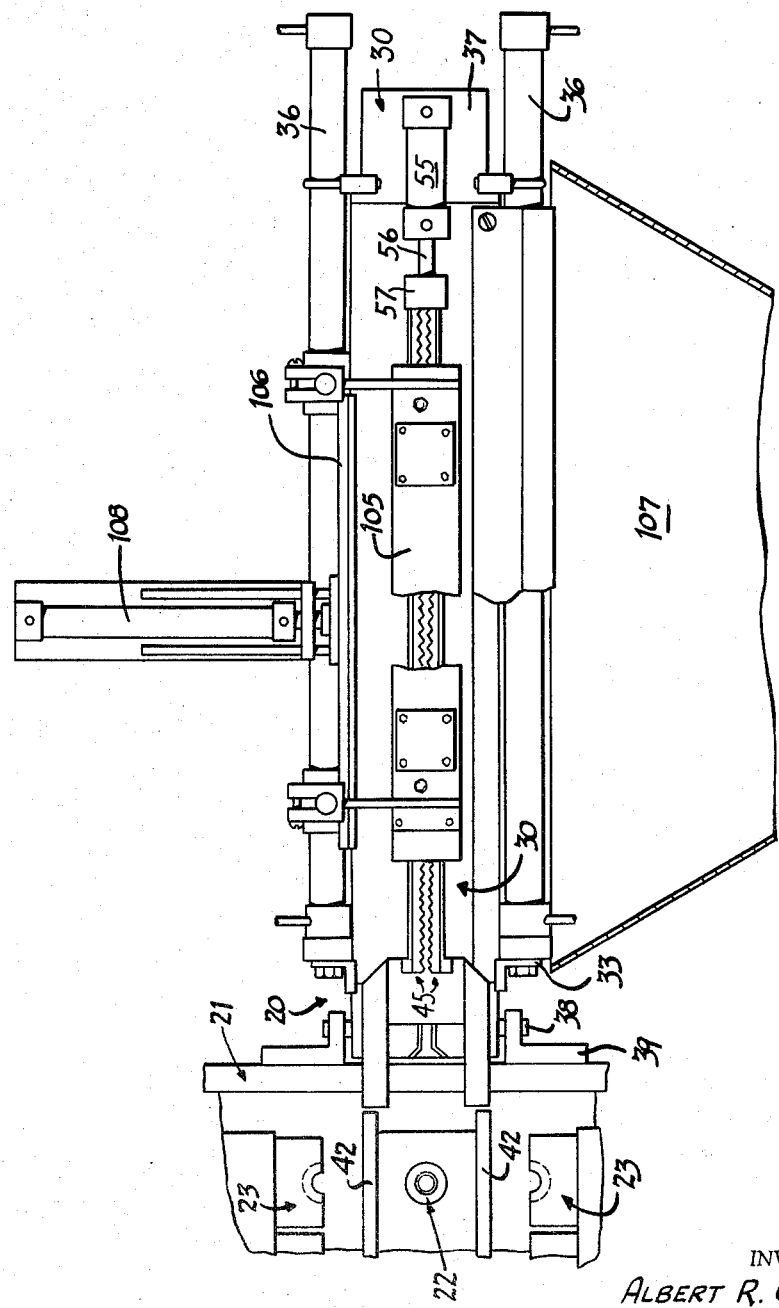

As shown on the drawings:

In FIGURE 1, reference numeral 20 refers generally to a take-out mechanism of the present invention. As above explained, this take-out mechanism is effective to remove articles from a forming mechanism 21 of the type illustrated and described in detail in Patent No. 3,008,192.

The first function to be carried out by the take-out mechanism is the engagement and removal of formed articles and their integral waste portions from the forming machine, the articles each being indicated by reference numeral 24 (FIGURE 3) and each being joined to its respective orifice 22 by means of an integral depending waste portion 25 joined to the article 24 at a reduced thickness area of juncture 26, this area of juncture being pinched upon closure of the blow mold sections 23 prior to and during blowing. As explained in the above-identified patent, each blown article 24 has a neck portion 27 which is injection molded within vertically movable neck mold segments 28 and about a core pin 29 through which air is introduced into the artcle 24 to inflate the same to its final configuration. Initially, the article 24 is retained in its upright position of FIGURE 3 by confinement of the neck portion 27 within the neck mold segments 28 and by the attachment of the lower end of the article 24 to the orifice blocks 22 by means of the waste portion or "tail" 25.

The actual removal of the article 24 with its tail 25 intact is carried out by means of a longitudinally reciprocable plate 30 having a slot 31 therein, this slot 31 being open at its forward end, as at 32. The plate 30 is provided with a pair of angled mounting brackets 33 secured, as by nuts 34, to the actuating rods 35 of fluid pressure actuated, double acting cylinders 36, these cylinders 36 being fixedly secured to a supporting base plate 37 mounted, as upon pivot pin 38 to attachment brackets 39 secured to the main frame of the forming apparatus 21.

Figure 2:
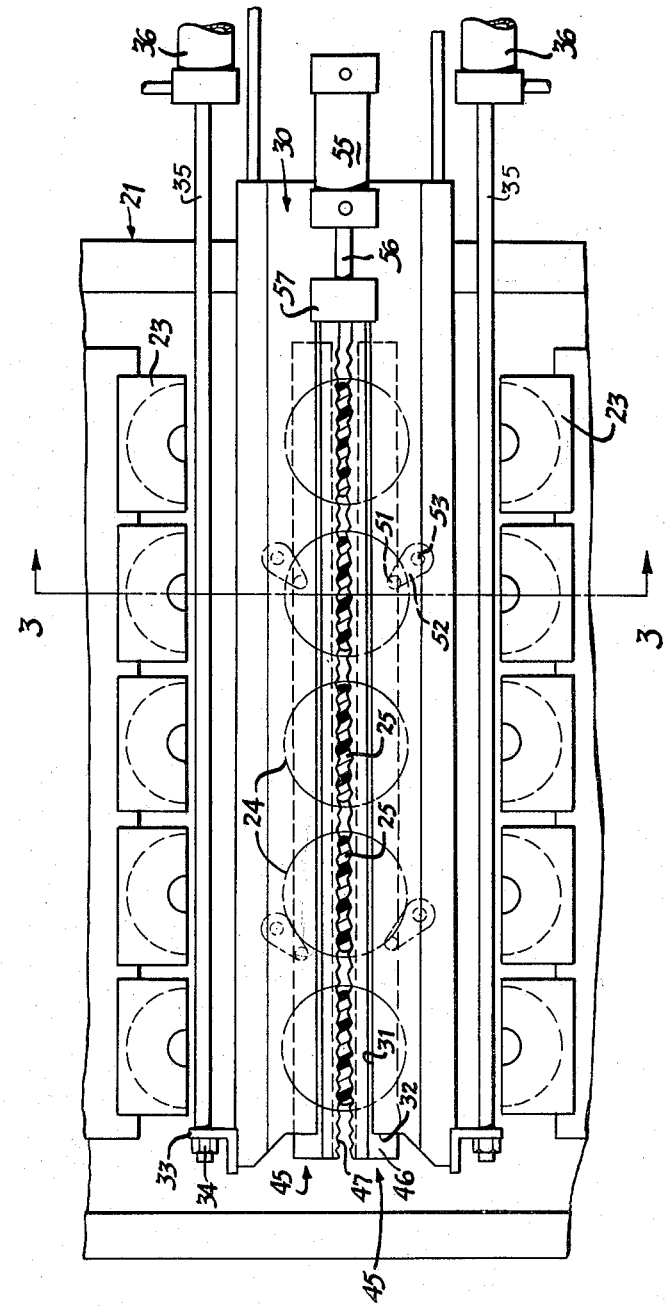
FIGURE 2 is an enlarged plan view similar to FIGURE 1, but illustrating the take-out mechanism in an extended position, i.e. inserted in the forming machine.

Upon actuation of the cylinders 36, the plate 30 is advanced from its retracted position of FIGURE 1 to its advanced position of FIGURE 2 with the waste portions 25 of the articles 24 being positioned in the plate slot 31. The plate 30 is provided at its longitudinal edges with downturned mounting legs 40 carrying freely rotatable supporting rollers 41 which engage guide rails 42 straddling the aligned orifice blocks 22 of the forming machine 21 and receivable in slots 43 formed in guide blocks 44 mounted upon the fixed base plate 37 (FIGURE 6).

Figure 3:
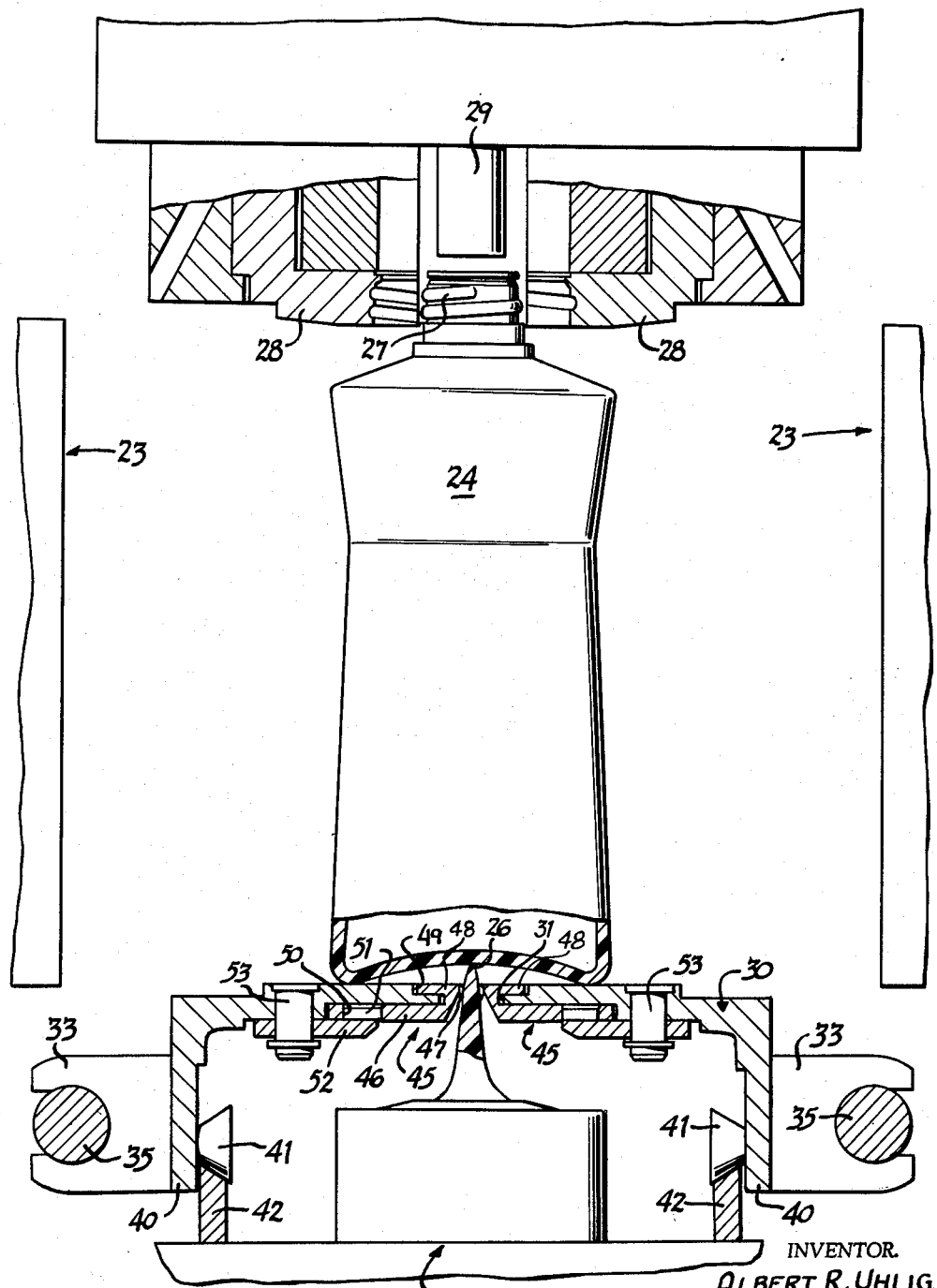
FIGURE 3 is an enlarged sectional view, with parts shown in elevation, taken along the plane 3—3 of FIGURE 2.

Carried by the movable plate 30 for both longitudinal and transverse relative sliding movement are a pair of cooperating gripper elements 45, best illustrated in FIGURE 3 of the drawings. These gripper elements 45 each comprise a lower planar portion 46 slidingly engaging the undersurface of the plate 30, serrated vertical gripping edges 47 joined to the lower portions 46 and in-turned upper guiding portions 48 slidably engaging the upper surfaces of the plate 30, the plate being recessed, as at 49, at its upper surface adjacent the slot 31 therein, so that the upper surface of the plate 30 and the upper surface of the gripper portion 48 are coplanar.

The lower portions 46 of each of the gripper elements is provided with a plurality of vertical apertures 50 receiving therein upstanding studs 51 formed on or secured to pivot links 52 which are pivotally connected to the plate 30 by vertically extending pivot pins 53. It will be seen from FIGURE 2 of the drawings that four such pivot links 52 are provided, the links being movable rotatably about their vertical axes provided by the pivot pins 53 and being connected rotationally, through the studs 51, to the gripper elements 45 to effect movement of the elements toward and away from one another. By the provision of two such links 52 for each of the gripper elements 45, the plate 30, the links 52 and the elements 45 form quadratic linkages. Thus, the elements are moved in parallelism toward and away from one another, and the serrated edges 47 are always parallel regardless of the arcuate positioning of the links 52.

The gripping members 45 are actuated by suitable power means, such as a fluid pressure actuated cylinder 55 mounted upon the movable plate 30 and displaceable therewith upon actuation of the cylinders 36. This fluid pressure actuated cylinder 55 has its piston rod 56 connected through block 57 to the gripper members 45 by means of a slotted connection, so that actuation of the piston will effect longitudinal displacement of the members 45 with the links 52 forcing the members 45 to move toward and away from one another depending upon the direction of actuation of the double acting cylinder 55.

All of the mechanism thus far described is identical to that disclosed in the above-identified application of Joseph E. Boyer, and reference to this application is made for the detailed construction and operation of the plate 30, the gripping members 45 and the actuating mechanism 55, 56, 57.

As best illustrated in FIGURES 4, 8 and 9, the main fixed supporting table 37 for the take-out mechanism supports at its rear end a pair of transversely inwardly projecting pivot trunnions 60, these trunnions suspending therebetween for pivotal movement a trunnion block 61. This trunnion block 61 has secured to the undersurface thereof, as by cap screws 62, a trunnion carriage 63, the carriage having elongated slots 64 by means of which the carriage may be adjusted longitudinally relative to the trunnion block 61.

The trunnion carriage 63 has an upwardly projecting embossment 65 which is apertured, as at 66, to receive therethrough a pair of pivot pins 67, a pivot bushing 68 being interposed between each of the pins 67 and the corresponding pin bore 66 to accommodate relative rotational movement of the pin within the bore. The pivot pins 67 are provided at their forward ends with threaded extremities 69 which fix the pins to gripper plates 70, respectively. These gripper plates have secured thereto, adjacent one extremity and by cap screws 71, mounting brackets 72 which are bored to receive the threaded extremities 69 of the pins 67. The gripper plates 70 arch upwardly, so that the upper extremity 72 thereof closely underlies the reciprocal pull-out plate 30 heretofore described. The other extremity of the elongated and arched gripper plates 70 are joined to forward blocks 73, respectively, as by cap screws 74, these blocks 70 being threadedly recessed to receive forward gripper pivot pins 75 which are axially aligned with the pivot pins 67 heretofore described, these forward pivot pins 75 being located in a vertically extending tear block 76 common to the two pins 75 and vertically actuatable as hereafter more fully described.

It will be appreciated that the pivot pins 67, 75 thus support the gripper plates 70 for relative lateral movement toward and away from one another and that the trunnion carriage 63 and the tear block 76 support the gripper plates 70 for joint arcuate displacement in a vertical plane about the axis of the tear trunnions 60.

The gripper arms 70 are of the configuration illustrated in detail in FIGURES 6 and 7 of the drawings, wherein it will be seen that the gripper arms are generally rectangular in configuration with their upper portions 72 being angularly recessed at their confronting edges, as at 77, to receive therein elongated gripper contact bars 80. These gripper contact bars 80 are of such configuration as to provide confronting, relatively sharply angular free gripping edges 81.

That face of each of the contact bars remote from the gripping edge 81 is provided with a longitudinally coextensive recess 82 (FIGURE 6) adapted to receive a coolant fluid, such as air, from a suitable source of fluid, as through an aperture indicated schematically at 83 (FIGURE 8). A plurality of drilled coolant passages 84 provides egress of the coolant from the passage 82 to those portions of the bar 80 adjacent the gripping edge 81 for a purpose to be hereinafter more fully described.

As above explained, the right hand end of each of the gripper plates 70 is provided with a mounting block 73 by means of which the gripper plate is disposed on its respective pivot pin 75 for pivotal movement relative to the tear block 76. Further, as illustrated in FIGURES 6 and 7, each of these blocks 73 is provided with a lower lateral projection 85, the projection for the right hand gripper plate 70 projecting to the left to underlie the left hand gripper plate 70, while the left hand gripper plate 70 has a projection 85 projecting to the right and underlying the right hand gripper plate 70.

These projections 85 are each of reduced longitudinal extent (FIGURE 8) and receive therebetween a gripper cylinder plate 86. This gripper cylinder plate 86 is connected to the two projections 85 by means of pivot pins 87, respectively, each of these pins being fixed to the cylinder plate 86 and being received in elongated slots 88 in the respective extensions 85.

The cylinder plate 86 is provided with a lower embossment 89 secured to an actuating rod 90 by suitable means, as by threads 91, the actuating rod 90 being adapted for vertical reciprocation by a gripper cylinder 92. This gripper cylinder 92 is secured, as by mounting collar 93, to the tear block 76. The tear block 76 is secured, adjacent its lower end, by a lateral pivot pin 94 to the actuating rod 95 of a tear cylinder 96 (FIGURE 4). The tear cylinder is supported on the main machine frame for pivotal movement about a lower pivot pin 97.

Secured to the trunnion carriage 63, as by cap screws 98, is a mounting bracket 99 carrying a tail chute 100. The other extremity of this tail chute 100 is secured by a mounting plate 101 and cap screws 102 to the tear cylinder block 76 for movement therewith. The tail chute 100 has an inclined bottom wall 103 down which tails 25 torn from containers 24 slide to a suitable receptacle for storage prior to regrinding.

As best illustrated in FIGURE 1 of the drawings, the overall apparatus may include an upper hold-down plate 105 for retaining containers 24 on the plate 30 and a laterally actuatable push-off plate 106 for displacing containers 24 on the plate 30 toward and into a discharge chute 107, the push-off plate being actuated by a fluid pressure cylinder 108. The details of this hold-down structure and push-off structure are disclosed in Patent No. 3,040,376 to Leon E. Elphee and assigned to the assignee of the present invention.

*Operation*

The overall operation of the device of the present invention is actuated by a fluid pressure actuated system illustrated in FIGURE 10 under the control of an electrical control system illustrated in FIGURE 11.

Initially, the condition of the apparatus is as illustrated in FIGURE 1 of the drawings, the plate 30 being retracted to its position exterior to the forming apparatus, the actuating rod 35 of the cylinders 36 being retracted, the actuating rod 56 of the clamping element cylinder 55 also being retracted to space apart the clamping edges 47, the gripper cylinder 92 being actuated to its upper position of FIGURE 6 to space apart the edges 81, and the tear cylinder 96 having its actuating rod 95 extended vertically upwardly as illustrated in FIGURE 4.

The initial actuation of the take-out device occurs in response to a signal indicating completion of the forming cycle of the apparatus 21. Such a signal may originate by closure of the timer contacts T1 to indicate that the blow mold segments 23 are opened to their positions of FIGURE 3 to expose therebetween the container 24 having its finish or neck portion 27 still confined within the segmental neck mold sections 28 and being interconnected at its bottom end through the tail or waste portion 25 to the orifice block 22.

The electrical control circuits of FIGURE 11 each receive electrical power from lines 109.

Closure of the contact points T1 will actuate relay CR1 and closure of the relay points CR1–1 will energize the solenoid S1 of the valve V1 to displace the valve to its illustrated position of FIGURE 10 wherein valve passage V1–1 connects the blind end of the cylinder 36 through line 110a with a source of air under pressure through conduit 110 to extend the actuating rod 35. The rod end of the cylinder 36 is exhausted through line 116 and valve passage V1–2. The extension of the actuating rod 35 will carry the take-out plate 30 to its illustrated positions of FIGURES 2 and 3 of the drawings, wherein the waste portions 25 are positioned between the gripper plates 45.

When the plate 30 is in its fully extended position of FIGURE 2, limit switch LS2 is actuated to actuate relay CR2. This relay CR2 has one set of contacts CR2–1 which bridge the limit switch LS2 to continue actuation of the relay CR2 despite opening of the momentarily closed switch LS2, while a second set of contacts CR2–2 energizes the solenoid S2 for valve V2 and a third set of contacts CR2–3 de-energizes relay CR1 and solenoid S1 for valve V1.

Thus, de-energization of the solenoid S1 will allow the spring SP1 to move the valve V1 from its position of FIGURE 10, so that the rod end of the cylinder 36 is connected with air pressure in conduit 110 through the line 116 and valve passage V1–3. The blind end of the cylinder 36 is exhausted through valve passage V1–4 and line 110a.

Energization of the solenoid S2 for the valve V2 will shift the valve V2 from its illustrated position of FIGURE 10, so that the valve passage V2–1 will interconnect the blind end of the cylinder 55 through lines 113 and 112 with a source of hydraulic fluid under pressure in conduit 111. The rod end of the cylinder 55 will be connected to a drain D by line 114, valve passage V2–2 and drain line 115.

This actuation of the cylinder 55 will, by means of the piston 56, move the clamping elements 45 into engagement with the tails 25 of the formed articles 24. At substantially the same time, the neck mold segments 28 are opened and the core pin 29 is vertically upwardly retracted to free the upper end of the article 24, so that removal of the article is accommodated.

Upon retraction of the piston rod 35 and the take-out plate 30, the articles will be removed from the forming machine 21, such removal tearing the tails 25 from molten material still in the orifice blocks 22, and the take-out thus removes the articles 24 with the integral tail 25 from the forming apparatus. The retraction of the plate 30 and the articles 24 thereon continues until such time as limit switch LS3 is actuated by some portion of the take-out plate 30, such as the cylinder rod attachment brackets 33.

Actuation of this limit switch LS3 will de-actuate the relay CR2 and initiate actuation of a time delay relay TD1. The timer contacts T1 are opened at some phase of the operation of the device prior to closure of the limit switch LS3 upon retraction of the take-out plate, so that de-actuation of the relay CR2 does not re-activate the relay CR1.

The limit switch LS3 is of the double pole type so that de-energization of the relay CR2 and energization of the time delay TD1 is substantially simultaneous. The time delay contacts TD1–1, closed by actuation of the time delay TD1 energizes the solenoid S3 to displace valve V3 to the right, against the compression force of the spring SP3, as viewed in FIGURE 10 of the drawings. This actuation of the valve V3 will introduce fluid under pressure from conduit 111 and line 117 for flow through valve passage V3–1 and line 118 into the upper or rod end of the cylinder 92. At the same time, hydraulic fluid is exhausted from the blind end of the cylinder 92 through line 119, valve passage V3–2 and drain line 120.

As a result, the gripper block 86 is moved vertically downwardly to its position of FIGURE 7 which, through the actuating arms 85, moves the grippers 70 to their gripping position of FIGURE 7.

Closure of the limit switch LS4 by this downward movement of the plate 86 will energize solenoid S4 for the valve V4, shifting the valve V4 from its illustrated neutral position (at which the valve is normally retained by counterbalanced compression springs, not shown) toward the right. Such shifting of the valve V4 interconnects the source conduit 115 with the upper or rod end of the cylinder 96 by conduit 121, valve passage V4–1 and line 122. At the same time, the blind end of the cylinder 96 is vented to drain by conduit 123, valve passage V4–2 and drain line 124.

The limit switch LS4 also energizes the solenoid S6 for the valve V6 of FIGURE 10. This valve V6 receives air under pressure from the source line 110 through conduit 125. When the valve body is shifted to the right by the solenoid S6 against the force of the spring SP6, the valve passage V6–1 allows air under pressure to flow through the grippers 7. The gripper passages 81 and the apertures 84 direct this cooling air against the tails 25 to cool the tails, thereby insuring clean severing of the tails from the overlying articles 24.

Limit switch LS5 is actuated by displacement of the tear cylinder rod 95, and closing of the limit switch LS5 will de-energize the solenoid S4 and energize relay CR4. This relay CR4 has a first pair of contacts CR4–1 which bridge the limit switch LS5 to insure continued actuation of the relay CR4 despite the only momentary closure of the limit switch LS5, a second pair of contacts CR4–2 which close to energize solenoid S5 for the valve V4 and a third pair of contacts CR4–3 which de-energize the solenoid S4 whenever the solenoid CR4 is energized.

Energization of the solenoid S5 will displace the valve V4 to the right to interconnect the blind end of the cylinder 96 through line 123 and valve passage V4–3 with the source of hydraulic fluid through the line 121. Simultaneously, the rod end of the cylinder 96 is connected to drain and drain line 124 by valve passage V4–4 and conduit 122.

The time delay of the relay TD1 is of sufficient duration to insure continuous actuation of the solenoid S3 during the complete actuating cycle of the cylinder 96, as determined by the valve V4. Thus, the grippers 70 remain in constant contact with the article tails 25 during the complete actuating cycle of the cylinder 96. Actuation of the cylinder 96 moves the trunnion carriage and the grippers carried thereby from a position of FIGURE 4 to the position of FIGURE 5. Since the grippers are engaged with the tails of the articles 24 and the articles 24 are still supported upon the plates 30, such movement of the grippers will necessarily tear the tails 25 from the articles 24. If necessary, the articles 24 will be supported by the upper hold-down plate 105 against displacement from the plate during tearing of the tails 25. Additionally, the tail chute 103 will move with the trunnion carriage and grippers as is evident from a comparison of FIGURES 4 and 5.

Upon return of the tear cylinder to its position of FIGURE 4, and upon expiration of the time delay occasioned by the relay TD1, the relay times out and opens the contacts TD1–1 and TD1–2. The contacts TD1–1 de-energize the solenoid S3 and the spring SP3 returns the valve body V3 to its illustrated position of FIGURE 10, thus elevating the plate 86 (to open limit switch LS4) and moving the grippers to their released position of FIGURE 6. Opening of the time delay contacts TD1–2 de-energizes the solenoid S5, since the relay CR4 is de-energized.

Thus, the cycle of operation is completed and will be initiated again upon closure of timer contacts T1.

I claim:

1. In a take-out mechanism for a plastic forming machine in which a plurality of formed parts having integral waste portions are removed from the machine to a waste removal station at which the parts are aligned on a support plate with the waste portions projecting through an elongated slot in the plate, the improvements of a pivotal carriage underlying the plate and normally generally parallel thereto, a pair of elongated spaced gripper elements on the carriage, said gripper elements being substantially coextensive with the said plate slot and being disposed on either side of said slot, said elements being actuatable toward one another to be simultaneously engageable with the plurality of waste portions, first power means for moving said elements relative to the carriage to engage said waste portions, and second power means actuatable to jointly displace the carriage and said elements to tear the waste portions from said articles in progressive fashion as the articles are supported by said plate.

2. In a take-out mechanism as defined in claim 1, the further improvement of said gripper element being fluid permeable, and means for supplying coolant fluid under pressure to said gripper element to chill said waste portions.

3. In a take-out mechanism for a plastic forming machine in which a plurality of formed parts having integral waste portions are removed from the machine to a waste removal station at which the parts are aligned with the waste portions projecting through an elongated slot in a plate, the improvements of a pair of elongated gripper elements adjacent the plate and normally generally parallel thereto, said elements having hollow gripping projections terminating in perforated confronting edges spaced to receive said waste portions therebetween, means for supplying coolant fluid to said hollow projections for flow through the perforated edges against the waste portions, a carriage upon which said elements are mounted for movement relative to one another about separate axes each parallel to the length of the slot, means supporting said plate and said carriage for relative movement about an axis remote from the axis of relative movement of said elements, first power means for moving said elements relatively to engage said waste portions and second power means actuatable to relatively move said plate and said carriage to tear the waste portions from said articles in progressive fashion.

4. In a take-out mechanism for a plastic forming machine in which a plurality of formed parts having integral waste portions are removed from the machine to a waste removal station at which the parts are aligned on a support plate with the waste portions depending through an elongated slot in the plate, the improvements of a pair of elongated gripper elements underlying the plate and normally generally parallel thereto, said elements having confronting edges spaced to receive said waste portions therebetween, a first carriage section pivotal about a horizontal axis underlying the plate and pivotally supporting the adjacent end of each of the gripper elements, a second carriage section pivotally supporting the other end of each of the gripper elements and freely vertically movable, said elements being supported by the carriage sections for movement relative to one another about separate axes each parallel to the length of the slot, first power means mounted on one of the carriage sections and connected to the gripper elements for moving said elements relatively to one another and relatively to said carriage sections into and out of engagement with said waste portions, and second power means connected to the second carriage section for bodily moving both said carriage sections and said gripper elements to tear the waste portions from said articles in progressive fashion as the articles are supported on said plate.

5. In a take-out mechanism for a plastic forming machine in which a plurality of formed parts having integral waste portions are removed from the machine to a waste removal station at which the parts are aligned with the waste portions projecting through an elongated slot in a plate, the improvements of a pair of elongated gripper elements adjacent the plate and normally generally parallel thereto, said elements having confronting edges spaced to receive said waste portions therebetween, a carriage upon which said elements are mounted for movement relative to one another and relative to said carriage about separate axes each parallel to the length of the slot, means supporting said plate and said carriage for relative movement from their normally generally parallel relation and about an axis angularly related to the axis of relative movement of said elements, first power means for moving said elements relatively to engage said confronting edges with said waste portions, and second power means actuatable to relatively move said plate and said carriage to tear the waste portions from said articles in progressive fashion.

6. In a take-out mechanism for a plastic forming machine in which a plurality of formed parts having depending integral waste portions are removed from the machine to a waste removal station at which the parts are aligned on a support plate having an elongated slot through which the waste portions depend, the improvements of a pair of elongated gripper elements underlying the plate and normally generally parallel thereto, said elements having spaced gripping edges, respectively, between which said waste portions depend, a carriage also underlying said plate and upon which said elements are mounted for movement relative to one another about separate axes each parallel to the length of the slot, trunnions supporting said carriage for movement about a horizontal axis underlying said plate and normal to the axis of relative movement of said elements, first power means actuatable to move said elements relatively to engage said waste portions, second power means actuatable to move said carriage about said trunnions and away from said plate to tear the waste portions from said articles in progressive fashion, and means for actuating said second power means only after said first power means has been actuated.

References Cited in the file of this patent
UNITED STATES PATENTS 3,040,376    Elphee _____ June 26, 1962